United States Patent
Cunningham et al.

[19]

[11] Patent Number: 6,141,359
[45] Date of Patent: Oct. 31, 2000

[54] MODELOCKING LASER INCLUDING SELF-TUNING INTENSITY-DEPENDENT REFLECTOR FOR SELF-STARTING AND STABLE OPERATION

[75] Inventors: John Edward Cunningham, Lincroft; Wayne Harvey Knox, Rumson, both of N.J.

[73] Assignee: Lucent Technologies, Inc., Murray Hill, N.J.

[21] Appl. No.: 09/016,622

[22] Filed: Jan. 30, 1998

[51] Int. Cl.[7] .............................. H01S 3/098; H01S 3/113
[52] U.S. Cl. ................... 372/18; 372/11; 372/25; 372/45; 372/99; 359/839; 359/884
[58] Field of Search ................. 372/11, 18, 25, 372/45, 99; 359/839, 884

[56] References Cited

U.S. PATENT DOCUMENTS

| | | | |
|---|---|---|---|
| 5,237,577 | 8/1993 | Keller | 372/11 |
| 5,434,873 | 7/1995 | Delfyett, Jr. | 372/18 |
| 5,627,848 | 5/1997 | Fermann et al. | 372/18 |
| 5,627,854 | 5/1997 | Knox | 372/99 |
| 5,701,327 | 12/1997 | Cunningham et al. | 372/99 |

FOREIGN PATENT DOCUMENTS

WO 94/10729  11/1994  United Kingdom.

*Primary Examiner*—Hemang Sanghavi
*Assistant Examiner*—Benjamin Cushwa

[57] ABSTRACT

The present invention is an improved modelocked laser comprising an optical gain medium and an optical cavity including a self-tuning saturable reflector incorporating one or more quantum wells. In the improved laser, the self-tuning saturable reflector comprises a first Bragg grating having a reflection spectrum broader than the spectrum of desired lasing and an additional Bragg reflector for light in the spectral region of lasing to provide self-starting and stable operation without mechanical tuning. The Bragg reflectors are preferably semiconductor quarter wave reflector stacks, and the saturable absorber is one or more quantum wells within the outer stack. The invention also encompasses the new saturable reflector used in such lasers.

11 Claims, 3 Drawing Sheets

MODELOCKING LASER INCLUDING SELF-TUNING INTENSITY-DEPENDENT REFLECTOR FOR SELF-STARTING AND STABLE OPERATION

TECHNICAL FIELD

This invention relates to modelocking lasers and, in particular, to modelocking lasers including self-tuning intensity dependent reflectors for self-starting and stable operation. Such lasers are particularly useful for the generation of ultrashort optical pulses.

BACKGROUND OF THE INVENTION

Semiconductor saturable absorbers have found applicability as modelocking elements in solid state lasers for generating extremely short duration optical pulses. These pulses are commonly called ultrashort pulses because they exhibit pulse widths in the picosecond and sub-picosecond ranges. Ultrashort optical pulses are useful for high speed signal processing and data communications.

The saturable absorber allows passive modelocking of a laser when the absorber, which is a nonlinear element, is placed either within the lasing optical cavity or in an external optical cavity coupled to the lasing cavity. Saturable absorbers act as shutters to incident radiation because they can change their opacity as a function of the intensity of the incident radiation at a particular wavelength. A saturable absorber can absorb all weak incident radiation. As the intensity of incident radiation reaches a sufficiently high level, known as the saturation intensity, incident radiation is permitted passage through the saturable absorber. In general, attenuation caused by the absorber is relatively low because the absorber is saturated into a transparent state at the desired wavelength.

Semiconductor saturable absorbers have been fabricated for narrowband and broadband response. Bulk semiconductor material and multiple quantum well heterostructures have been used for narrowband absorption applications while specially graded bandgap multiple quantum well heterostructures have been developed for broadband applications. In the quantum well realizations of such absorber devices, the quantum well heterostructure has been grown on a semiconductor quarter-wave stack reflector. In another embodiment known as an anti-resonant Fabry-Perot saturable absorber, a thin film oxide partial reflector stack was deposited on the quantum well heterostructure to form a Fabry-Perot etalon with the semiconductor quarter-wave stack reflector. For the latter device, the saturable absorber element (MQW) responds to radiation at wavelengths in the anti-resonant portion of the Fabry-Perot etalon response characteristic. This device produces weak coupling with the laser cavity and introduces less loss than other multiple quantum well devices used for modelocking the laser. By the same token, the anti-resonant Fabry-Perot saturable absorber requires significant additional device processing and optimization for its realization.

U.S. Pat. No. 5,627,854, issued to applicant W. H. Knox on May 6, 1997, describes a modelocking solid state laser wherein the modelocking element is a saturable Bragg reflector incorporating one or more quantum wells within a semiconductor quarter wave stack reflector. The resulting nonlinear reflector provides an intensity dependent response which permits it to be used for saturable absorption directly in the main oscillating cavity of a laser.

The saturable modelocking element of the '854 patent has permitted the fabrication of femtosecond modelocked lasers. However for self-starting and stable operation, it has been necessary to incorporate a mechanical tuning element such as a prism and aperture in the cavity of the laser. Such mechanical tuning elements require precise alignment. They increase the size of the device, increase manufacturing cost and present the potential of destroying laser operation by mechanical shock. Accordingly, there is a need for an improved modelocking solid state laser that can achieve self-starting and stable operation without mechanical tuning elements.

SUMMARY OF THE INVENTION

The present invention is an improved modelocked laser comprising an optical gain medium and an optical cavity including a self-tuning saturable reflector incorporating one or more quantum wells. In the improved laser, the self-tuning saturable reflector comprises a first Bragg grating having a reflection spectrum broader than the spectrum of desired lasing and an additional Bragg reflective grating for light in the spectral region of lasing to provide self-starting and stable operation without mechanical tuning. The Bragg reflectors are preferably semiconductor quarter wave reflector stacks, and the saturable absorber is one or more quantum wells within the outer stack. The invention also encompasses the new saturable reflector used in such lasers.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

The self-tuning saturable reflector employs a first Bragg reflector, preferably a quarter wave stack dielectric reflector, having a moderate reflectance ($94\% \leq R_1 < 97\%$) extending beyond the spectrum of desired lasing and a second Bragg reflector, again preferably a quarter wave stack reflector, providing high reflectivity ($R_2$ such that $99\% \leq R_1 + R_2$) selectively in the spectral region of the desired lasing. The reflector also incorporates one or more quantum wells disposed at predetermined location(s) within the reflector (preferably in the outermost grating) to provide the nonlinear characteristic for the reflector. This structure acts as a self-tuning low loss saturable absorber which can be utilized directly within the main lasing cavity of a laser such as a solid state laser. Self-starting and stable operation can be achieved without the necessity of mechanical tuning elements. The preferred device can be grown by molecular beam epitaxy and requires no further processing such as growth, deposition, or oxidation to be ready for use as an intracavity saturable absorber.

Figure 1:
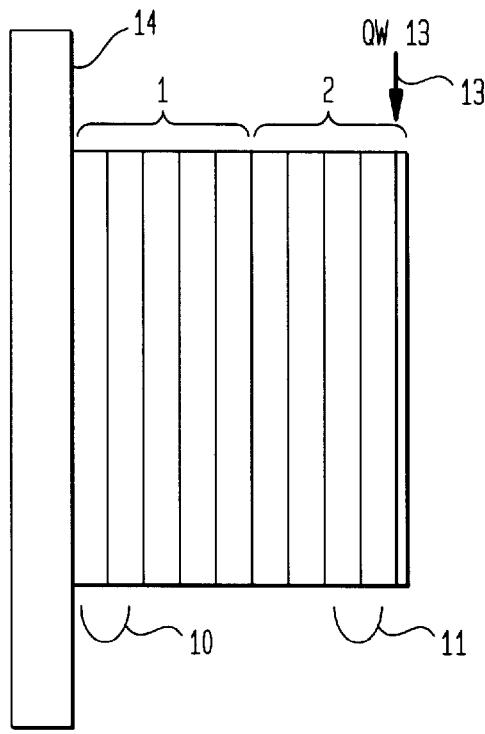
FIGS. 1 and 2 each show a cross-sectional view of alternative embodiments of the self-tuning saturable Bragg reflector realized in accordance with the principles of the invention.
Figure 2:
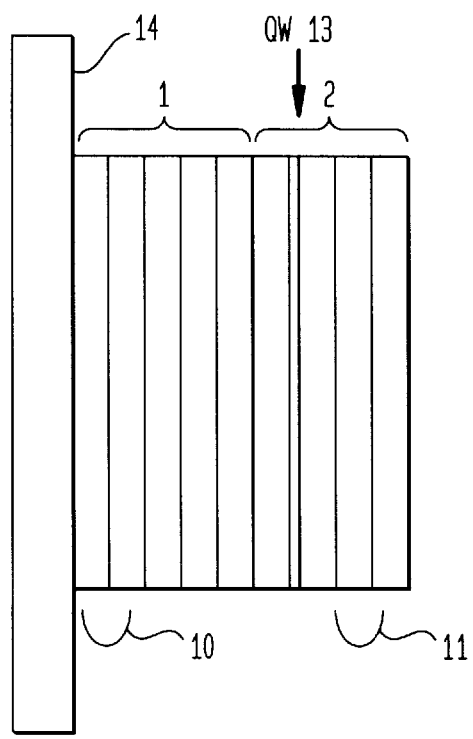

The illustrative embodiments of the invention shown in FIGS. 1 and 2 employ a single quantum well grown within or upon the reflector structure. These devices are shown on a GaAs substrate 14 with layers formed in the AlAs/AlGaAs semiconductor compound system for illustrative purposes only.

In each device, the first Bragg reflector 1 is a relatively broadband reflector comprising a series of alternating material layers having different refractive indices. It can also be viewed as a plurality of pairs of layers wherein each pair 10 of layers includes one wide energy bandgap layer and one narrow energy bandgap layer. When the layers are arranged with individual layer thicknesses approximating a quarter wavelength (one quarter of an optical path wavelength), the stack of layers will form a mirror. The first reflector 1 can comprise twenty to forty pairs of AlAs/AlGaAs layers. The mole fraction x for the compound $AlGa_{1-x}As_x$ is varied between 1.0 in the wide bandgap AlAs layers to 0.15 in the narrow bandgap AlGaAs layers. This system of layers is suitable for operation in the wavelength range around 850 nm. Since the reflector is a standard quarter wave stack design, the optical thickness of each layer should be approximately one-quarter of the desired wavelength of operation. The reflector alone without the quantum well exhibits an intensity independent reflectivity and, if placed in a laser cavity, will not influence or induce modelocking. The first reflector achieves a reflectivity $R_1$ of approximately 94–97% for a spectral range exceeding the range of desired lasing and preferably has reflectivity of 95–96% in the range of lasing.

The second reflector 2 is a narrower band reflector which can be formed overlying the first reflector. The second reflector is also preferably a quarter wavelength stack of 10–25 pairs 11 having thickness for selectively reflecting light in the range of desired lasing. The second reflector has a reflectivity $R_2$, which in combination with the first provides a reflectivity of near unity for the range of lasing ($99\% \leq R_1+R_2 \leq 100\%$).

A single quantum well 13 provides saturable absorption, that is, intensity dependent absorption which is required for modelocking. The quantum well is grown in or near the top surface of the outer reflector (FIG. 1) when a low saturation intensity is desired; it is grown farther from the top surface of the second reflector (FIG. 2) when a high saturation intensity is desired. Experimental results now show that high quality modelocking results occur when the quantum well is placed within the first quarter wave thick layer of the reflector where the intensity of the incident radiation is very high. The quantum well can be placed at other locations within the second reflector. Additional quantum wells can be disposed within the reflector to obtain a particular saturation characteristic. In addition, the quantum wells can have differing thicknesses or bandgap energies to affect the range (bandwidth) of the saturation effect.

Since the quantum well interacts with the standing wave pattern of the optical signal, placement of the quantum well at a specific location within a selected pair of layers also affects the saturation intensity. It is considered desirable, though not limiting, to place the quantum well near an intensity peak in the standing wave pattern.

Insertion of the quantum well or quantum wells within the second reflector in no way changes the nature of the mirror from being a single, high reflectance reflector. The Bragg reflector, even though its structure is briefly interrupted by the quantum well, is still a single reflector and not an etalon or cavity reflector. The maximum reflectance of the saturable reflector in experimental practice is approximately 99.8%. The presence of the quantum well modifies the reflection (absorption) characteristic of the saturable Bragg reflector near the exciton wavelength.

As shown in FIGS. 1 and 2, the quantum well layer is grown in the narrow bandgap AlGaAs layer. The mole fraction x for the quantum well is chosen so that the excitons are confined to a state below the bandgap of the narrow bandgap layers in the Bragg reflector. In an example from experimental practice, a mole fraction less than 0.15 is suitable for use. A quantum well thickness of approximately 100 angstroms has been used in the experimental device with an exciton wavelength of approximately 850 nm.

It has been discovered that the thickness of the reflector layer which includes the quantum well can be maintained at its standard quarter wave thickness diminished by the quantum well thickness without any significant change in performance. That is, there is no need for a first approximation to account for the actual change in optical path length caused by the presence of the quantum well in the reflector layer. As such, the total thickness of the reflector layer together with the quantum well layer can be approximated with sufficiently good results by the quarter wave thickness of a standard reflector layer of the same material type without the quantum well.

Figure 3:
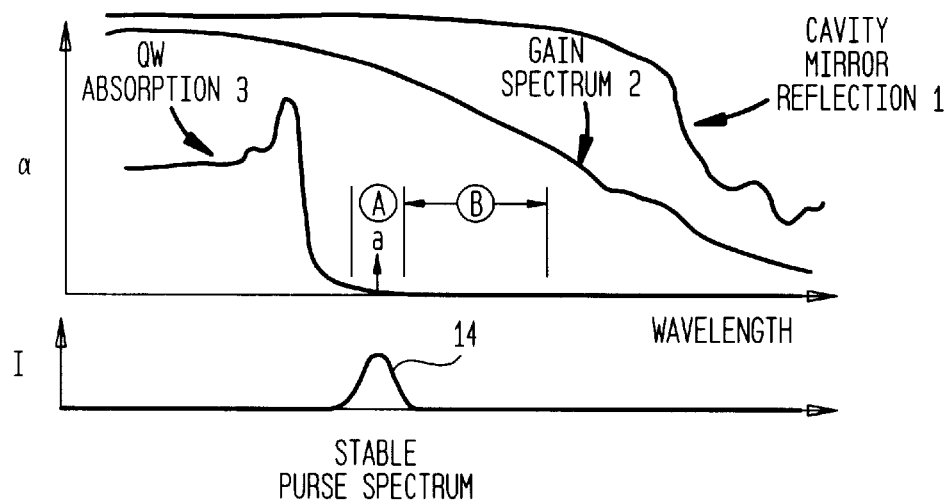
FIG. 3 shows a typical spectral curves for a modelocking pulse laser.

FIG. 3 is a qualitative graphical illustration useful in understanding the effect of the second reflector in providing stable self-starting and stable operation of a modelocking laser. The figure illustrates in curves 1–4, respectively, the reflectivity spectrum, the gain spectrum of the laser, the quantum well absorption spectrum and the spectral region of stable laser operation. For reliable self-starting, the continuous wave lasing wavelength should be in region A, close to the quantum well absorption region. In such case, nonlinear absorption caused by the saturation of the quantum well leads to stable self-starting modelocking. However, if the cavity gain and reflectivity spectra allow continuous wave lasing in the longer wavelength region B, then modelocking will not start. Therefore, in accordance with the invention, a second reflector providing enhanced reflectivity selectivity in the region A is provided to ensure that continuous wave lasing starts up in the region A.

Figure 4:
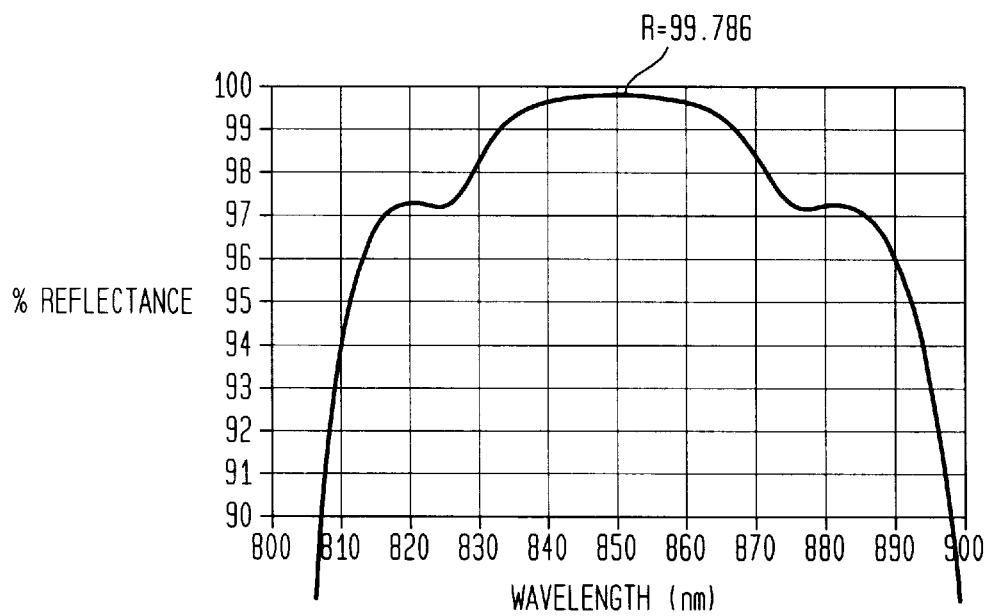
FIG. 4 shows a typical reflectivity curve for a self-tuning saturable Bragg reflector.

As a specific example, a self-tuning saturable Bragg reflector can be formed on a GaAs substrate using molecular beam expitaxy. The first reflector comprises 25 pairs of AlGaAs, each pair comprising 62.4 nm AlGaAs (x=0.3) and 60.4 nm AlGaAs (x=0.16). The second reflector comprises 15 pairs of AlGaAs/AlAs, each pair comprising 60.4 nm AlGaAs (x=0.16) and 71.1 nm AlAs. The quantum well can be formed in the top layer. The reflectance spectrum of this exemplary device is shown in FIG. 4.

Figure 5:
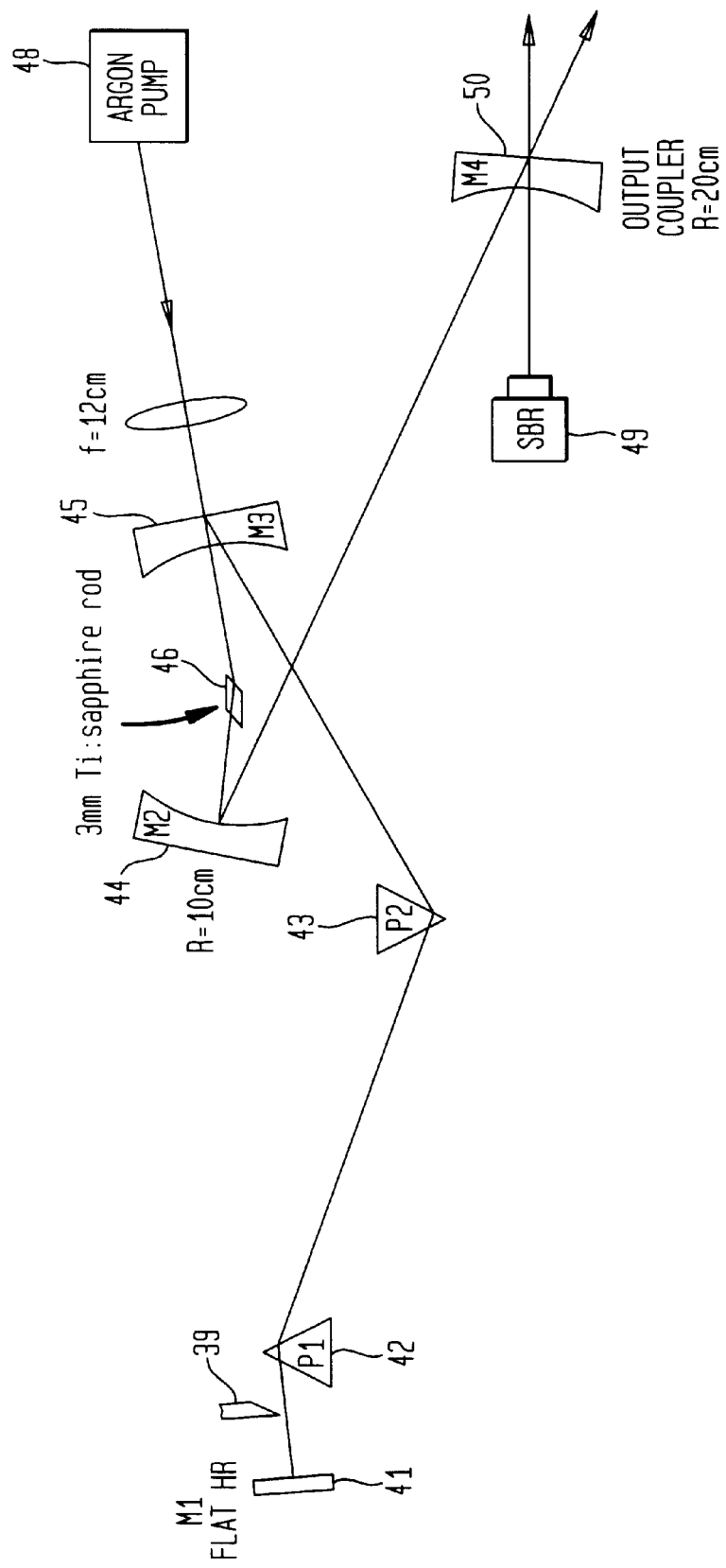
FIG. 5 shows a schematic diagram of a solid state laser including the self-tuning saturable Bragg reflector as an intracavity element for laser modelocking.

FIG. 5 shows the self-tuning saturable Bragg reflector (SBR) within the main cavity of a Ti:Sapphire laser for modelocking the laser. Ti:Sapphire rod 46 (3 mm long) is pumped by argon laser 48. The Ti:Sapphire rod provides optical gain for the modelock laser. Lens 47 is used for coupling the pump beam into the optical cavity. The main caser cavity is formed between high reflectivity mirror 41 and the saturable Bragg reflector 49. Mirrors 44 and 45 are used for directing the optical signals through rod 46 as the gain medium. Brewster prisms 42 and 43 provide adjustable negative and positive dispersion which is used for pulse shaping. A knife edge 39 is preferably disposed between mirror 41 and 42. The saturable Bragg reflector is placed substantially at the focal point of 20 cm radius curved mirror 50. Output coupling of the optical pulses produced by the laser is provided through mirror 50.

Saturation of the saturable Bragg reflector modelocks the laser in FIG. 5 which produces a modelock sequence of optical pulses. Pulsewidth is determined by dispersion and bandwidth limiting properties of the saturable Bragg reflector. The arrangement has been used to generate ultrashort optical pulses having a pulse autocorrelation of approximately 90 fs.

It should be noted that the dispersion compensation provided by the Brewster prisms 42 and 43 can be removed from the laser cavity. In this case, pulsewidths of approximately 5 ps can be obtained from the laser. Self-starting for the modelocking process is readily obtained because the saturation nonlinearity is based upon energy of the incident radiation, not its intensity. As a result, the use of the saturable Bragg reflector in modelock lasers is advantaged over modelock laser employing the pure Kerr lenses.

It is contemplated that the quantum wells can be grown at low temperature to produce a short response time for the device. It is understood that, while the Group III–V material system AlAs/AlGaAs is described above for fabricating the saturable Bragg reflector, other material combinations may be selected from other semiconductor Group III–V systems such as GaAs/InGaAs, InGaAs/InAlAs, GaAs/AlAs, GaAsSb/GaAlSb and InGaAsP/InP to realize the device. In these semiconductor systems, the layers may be lattice-matched to suitable GaAs or InP substrates. Mismatching is also contemplated wherein strained layers are grown over the substrate material. Finally, extension of the device structures to semiconductor compounds in Group II–VI and Group IV is also contemplated.

What is claimed is:

1. A laser for generating an optical beam at a spectrum of desired lasing, said laser comprising first and second end reflectors and a gain medium, said second end reflector including a first inner quarter-wave stack of dielectric material layers, a second outer quarter-wave stack of dielectric materials and a quantum well layer within one of said layers in the said outer stack so that said second end reflector provides a nonlinear saturation response to incident radiation in order to modelock said laser, said first quarter wave stack having a reflection spectrum broader than the spectrum of desired lasing but providing insufficient reflectivity to produce lasing and said second quarter-wave stack having a reflection spectrum narrower than the first stack and a reflectivity which in combination with said first quarter-wave stack provides, sufficient reflectivity to produce lasing selectively in the spectrum of desired lasing.

2. A laser as defined in claim 1 wherein said first quarter wave stack and said second quarter wave stack when combined provide reflectivity of 99% or more selectively in the spectrum of desired lasing.

3. The laser as defined in claim 1 wherein each quarter-wave stack comprises a plurality of alternately wide and narrow bandgap semiconductor material.

4. The laser as defined in claim 1 wherein the quantum well is located in an uppermost layer of said second quarter wave stack.

5. The laser as defined in claim 4 wherein the wide bandgap layers comprise AlGaAs and the narrow bandgap layers comprise AlAs.

6. The laser as defined in claim 1 wherein the quantum well is located proximate a top surface of said second quarter wave stack.

7. The laser as defined in claim 1 wherein the quarter-wave stack comprises a plurality of alternately wide and narrow bandgap semiconductor material.

8. The laser as defined in claim 7 wherein the quantum well is located in an uppermost layer of said second quarter-wave stack.

9. The laser as defined in claim 8 wherein the wide bandgap layers comprise AlGaAs and the narrow bandgap layers comprise AlAs.

10. The laser as defined in claim 7 wherein the quantum well is located proximate a top surface of said second quarter wave stack.

11. The laser as defined in claim 1 wherein the spectrum of desired lasing is the spectrum of stable laser operation.

* * * * *